(12) United States Patent
Valentini et al.

(10) Patent No.: US 11,057,508 B2
(45) Date of Patent: Jul. 6, 2021

(54) SELF WIDTH-ADJUSTING DEVICE HOLDER AND METHOD FOR HOLDING A DEVICE

(71) Applicants: Adriano Valentini, Montreal (CA); Robin Di Guida, Laval (CA); Antonio Giancola, Montreal (CA); Steve Boa, Montreal (CA)

(72) Inventors: Adriano Valentini, Montreal (CA); Robin Di Guida, Laval (CA); Antonio Giancola, Montreal (CA); Steve Boa, Montreal (CA)

( * ) Notice: Subject to any disclaimer, the term of this patent is extended or adjusted under 35 U.S.C. 154(b) by 0 days.

(21) Appl. No.: 16/787,761

(22) Filed: Feb. 11, 2020

(65) Prior Publication Data

US 2020/0259941 A1    Aug. 13, 2020

Related U.S. Application Data

(60) Provisional application No. 62/803,889, filed on Feb. 11, 2019.

(51) Int. Cl.
| | |
|---|---|
| *H04M 1/04* | (2006.01) |
| *F16M 11/10* | (2006.01) |
| *F16M 11/04* | (2006.01) |
| *F16M 13/02* | (2006.01) |

(52) U.S. Cl.
CPC ............ *H04M 1/04* (2013.01); *F16M 11/041* (2013.01); *F16M 11/10* (2013.01); *F16M 13/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,780,553 | B2 * | 7/2014 | Palmer | H04M 1/04 |
| | | | | 455/575.8 |
| 8,807,621 | B2 * | 8/2014 | Stephan | B60R 11/0241 |
| | | | | 296/37.12 |
| 9,475,515 | B2 * | 10/2016 | Carruthers | B62B 3/1428 |
| 9,840,264 | B1 * | 12/2017 | Johnson | B62B 3/1416 |
| 9,913,526 | B2 * | 3/2018 | Abreu | F16B 2/10 |
| 9,956,923 | B2 * | 5/2018 | Minn | B60R 11/02 |
| 10,793,084 | B2 * | 10/2020 | Jiang | B60R 11/0252 |

* cited by examiner

*Primary Examiner* — Quochien B Vuong
(74) *Attorney, Agent, or Firm* — Brouillette Legal Inc.; Robert Brouillette

(57) ABSTRACT

A self width-adjusting device holder comprises two width-adjustable side walls or plates, a stopper a resilient width-adjustment mechanism and a base plate. The two width-adjustable side plates are adapted to be pushed away from each other when a device is inserted and to automatically move toward each another or retract when a device is removed from the holder. The width-adjustable plates may be slidably mounted on the base plate. As these two side plates slide, the receiving area may be adjusted to be adapted to the devices with different sizes.

22 Claims, 20 Drawing Sheets

SELF WIDTH-ADJUSTING DEVICE HOLDER AND METHOD FOR HOLDING A DEVICE

CROSS-REFERENCE TO RELATED APPLICATIONS

The present patent application claims the benefits of priority of United Stated Provisional Patent Application No. 62/803,889, entitled "SELF WIDTH-ADJUSTING DEVICE HOLDER AND METHOD FOR HOLDING A DEVICE", and filed at the United States Patent and Trademark Office on Feb. 7, 2020, the content of which is incorporated herein by reference.

FIELD OF THE INVENTION

The present invention generally relates to devices for holding devices, such as smart phones, tablets and other computerized devices and method of use of the same. More particularly, the present invention relates to adjustable device holders adapted to automatically adapt to any range of computerized devices.

BACKGROUND OF THE INVENTION

With the spread and the adoption of consumer electronic devices, such as mobile phones, tablets and/or smart watch, consumers tend to use such devices in many types of environment. As such environments may require the use of hands, there an increased need for device holders. As an example, in automotive vehicles, device holders are well-known and are typically used for holding smart phone in order to have access to the functions of the said phone while driving a vehicle.

In recent years, with the rise in popularity of smart devices, various types of device holders for using in a vehicle or in person have been developed. As an example, U.S. Pat. No. 6,285,758 discloses an adjustable phone holder configured to adapt to a phone width by using a manual mechanism for reducing or expanding side walls of the holder.

Thus, there is still a need for an improved device holder for automatically adapting to the width of a phone received in the holder. There is yet a need for holder adapted to communicate with the phone.

SUMMARY OF THE INVENTION

The shortcomings of the prior art are generally mitigated by providing a universal automatic adjustable device holder.

In an aspect of the invention, the universal automatic adjustable device holder according to the present invention comprises a circuit board adapted to automatically connect and/or communicate with the device received by the holder. The holder is adapted to receive and expand width of the holder when the device is inserted.

In another aspect of the invention, the device holder generally comprises two width-adjustable side walls or plates, a stopper a resilient width-adjustment mechanism and a base plate. The two width-adjustable side plates are adapted to be pushed away from each other when a device is inserted and to automatically move toward each another or retract when a device is removed from the holder. The width-adjustable plates may be slidably mounted on the base plate.

The stopper is adapted to stop the insertion of the device in the holder. The stopper may be a bottom plate defining a substantially rectangular space to receive the device. The device may be any computerized device such as a mobile phone, a tablet, a smart watch, a remote controller, an automobile data recorder and so on. As these two side plates slide away or toward each another, the width of the holder is adapted to the width of the device being inserted.

The base plate may further comprise a hollow portion adapted to receive a circuit board.

In another aspect of the invention, the device holder may further generally comprise different types of brackets which are mounted to the base plate.

In another aspect of the invention, the device holder may comprise a body, a first and a second side members resiliently mounted on each side of the body and adapted to move away from one another, an alignment mechanism adapted to control movement of the side members in relation to the body, a clamping member mounted to the body, the clamping member being adapted to be mounted to an external member, wherein the first and second members may be adapted to move away from one another when the computerized device is inserted between the said first and second members and wherein the first and second members may be adapted to press and hold the computerized device upon insertion of the computerized device.

The two side members may further comprise an inclined upper portion, the inclined upper portions of the two side members forming a wider portion adapted to receive a portion of the computerized device to be inserted.

The holder may also comprise a stopper adapted to stop the insertion of the computerized device in the holder. The holder may further comprise a circuit board, the circuit board being configured to communicate with the computerized device. It may additionally comprise a switch in wireless communication with the circuit board, wherein an activated status of the switch being indicative of the computerized device being inserted in the holder.

The clamping member may comprise a hollow portion adapted to receive a portable power source configured to power the circuit board. The circuit board may be in sleep mode when the status of the switch is deactivated. It may further comprise one or more powered port connections.

The alignment mechanism may comprise a male portion adapted to slidingly move in a mating female portion. The female portion may be a slot and the male portion may be one or more protruding members. The body may comprise the slot and each of the side members may comprise at least a protruding member.

The holder may further comprise a coil having one end contacting one of the side members and the other end contacting the body. It may comprise two coils, each coil having one end contacting one of the side members and the other end contacting the body. The body may comprise a hollow portion adapted to receive the coil.

The clamping member may comprise a first and a second portions, the first portion being complimentary to the second portion, wherein the first and second portions are adapted to receive at least a portion of the external member.

The holder may further comprise a device retainer member adapted to secure the computerized device in place. The device retainer member may be a slidable tab adapted to secure the top of the computerized device. The device retainer may further comprise a mechanism blocking the first and second side members. The device retainer may also have a plurality of retaining elements mounted to the side members and each retaining element may comprise a fastener and a pad, wherein tightening the fastener applies pressure between the computerized device and the holder.

In another aspect of the invention, a method for holding a computerized device to an accessory is provided. The method comprises moving away from one another two resilient side members slidingly mounted to a holder by pushing a portion of the computerized device against an angled portion of the two resilient side members and resiliently holding the computerized device between the two side members.

The method may further comprise establishing a data communication between the computerized device and a circuit board of the holder. The method may also comprise activating a virtual security lock upon establishing the data communication between the computerized device and the circuit board. It may also comprise activating an alarm when the computerized device is pulled of the holder while the virtual security lock is activated.

The method may further comprise detecting geo-localization coordinates of the holder and displaying information on the computerized device based on the detected geo-localization coordinates.

Furthermore, the method may comprise establishing a data communication with a digital payment platform and sending payment information to the digital payment platform.

In yet another aspect of the invention, a device holder is provided. The device holder comprises a body, a first and a second side members resiliently mounted on each side of the body and adapted to move away from one another, each of the two side members comprising an inclined upper portion, the inclined upper portions of the two side members forming a wider portion adapted to receive a portion of the computerized device to be inserted, a stopper adapted to stop the insertion of the computerized device in the holder, an alignment mechanism adapted to control movement of the side members in relation to the body, a clamping member mounted to the body, the clamping member being adapted to be mounted to an external member, a circuit board, the circuit board being configured to communicate with the computerized device, wherein the first and second members are adapted to move away from one another when the computerized device is inserted between the said first and second members, wherein the first and second members are adapted to press and hold the computerized device upon insertion of the computerized device.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

Figure 1:
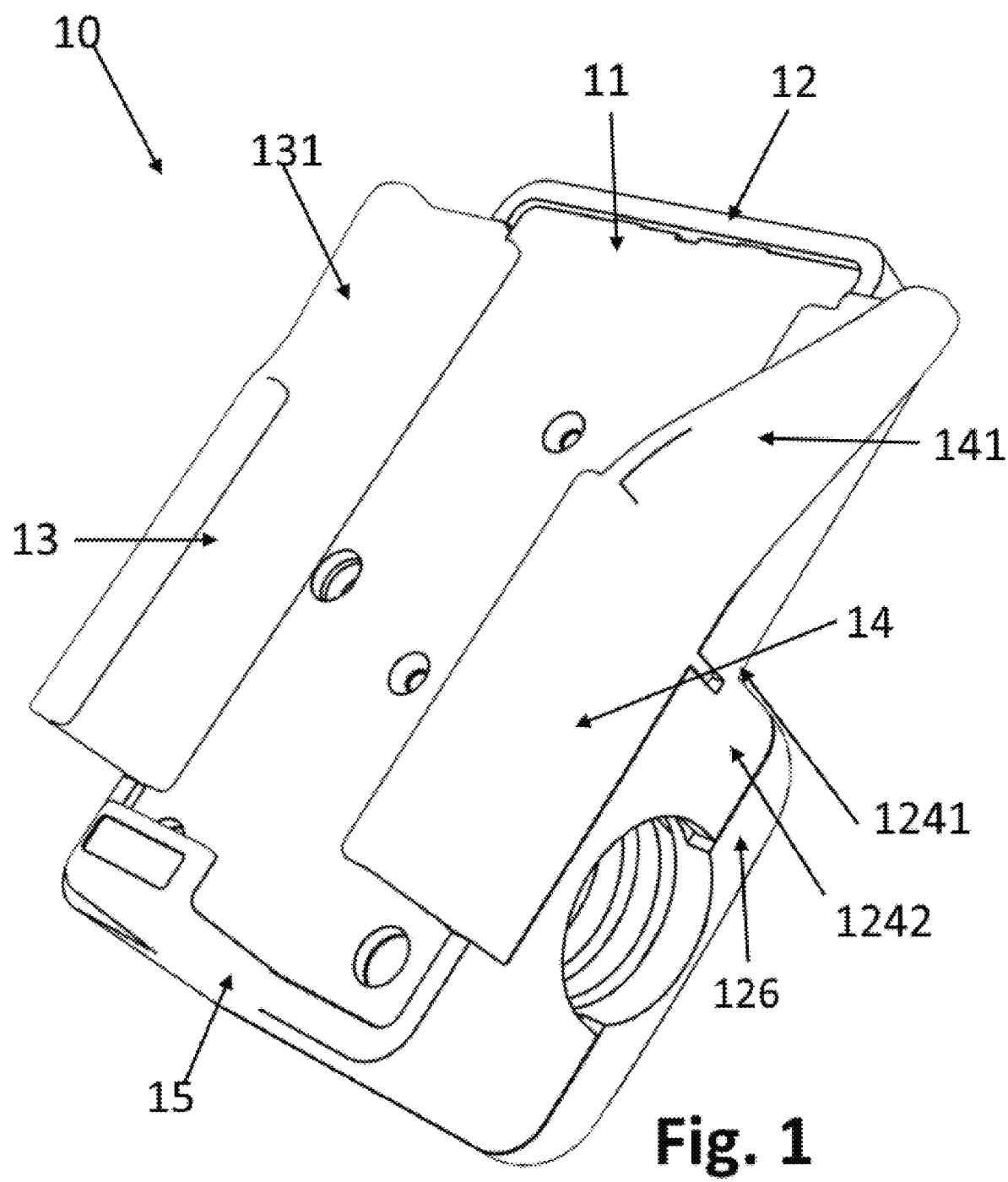
FIG. 1 is a front right perspective view of an embodiment of a smart device holder in accordance with the principles of the present invention.

A novel self width-adjusting device holder and method for holding a device will be described hereinafter. Although the invention is described in terms of specific illustrative embodiments, it is to be understood that the embodiments described herein are by way of example only and that the scope of the invention is not intended to be limited thereby.

A universal width-adjustable smart device holder 10 is provided. The device holder 10 generally aims at automatically adjusting its width as a function of the width of the device being inserted. When the device is removed from the holder 10, the width of the holder 10 is automatically adapted Now referring to FIGS. 1 and 2, an embodiment of the device holder 10 is shown. The device holder 10 comprises a moveable first side plate 13, a second moveable side plate 14 and a stopper 15. The holder also comprises a body or main portion 12 adapted to receive the first and second moveable side plates 13 and 14. The two width-adjustable side plates 13 and 14 are adapted to be pushed away from each another when a device is inserted in the holder 10 and to automatically move toward each another or retract when a device is removed from the holder 10. The width-adjustable plates may be slidably mounted on the main portion 12.

In some embodiments, the base portions 12 comprises a front plate 11 and side plates 12 forming a casing. In such embodiments, the base plate 12 is adapted to slidably mount the first side plate 13 and the second side plate 14. The holder 10 may be made of any rigid or semi-rigid materials well known to a person skilled in the art, such as plastic, metal, aluminum, steel, wood and/or any combination of material thereof. In a preferred embodiment, the holder 10 is made of resistant plastic.

In a preferred embodiment, each first side plate 13 and second side plate 14 comprises an inclined upper portion 131, 141. The inclined upper portions 131, 141 form a wider portion adapted to receive a portion of the device to be inserted. The inclination of the inclined portions 131 and 141 allows the transfer of the force of the device toward the stopper 15 to be transferred at least in part to the pushing of side plates 12 and 13 away from each another. Such structure generally aims at the device to be smoothly and easily inserted into the holder 10.

Understandably, the two side plates 13, 14 and the stopper 15 generally defines a peripheric section generally matching the shape of the device to be received. In a preferred embodiment, the peripheric section is generally rectangular space adapted to receive a device, such as a mobile phone, a tablet or any other portable computerized device. As the two side plates 13, 14 slide away from each another, the area formed by the stopper 15 and the two side plates 13, 14 is adapted to the side of the device being inserted.

Figure 2:
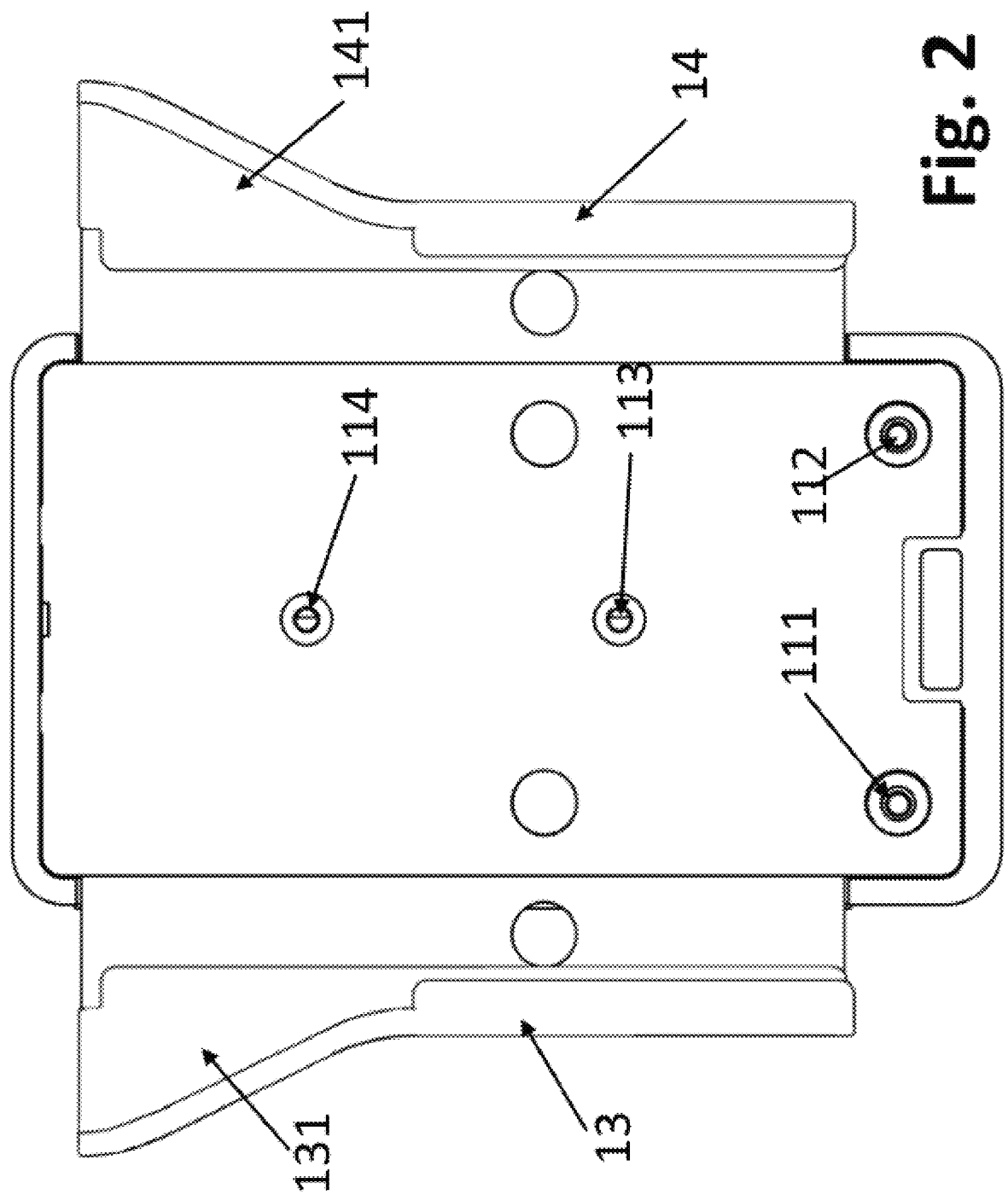
FIG. 2 is a front elevation view of the smart device holder of FIG. 1 shown two side plates being expanded.

Still referring to FIGS. 1 and 2, in some embodiments, the base portion 12 may comprise a front plate 11 generally covering the base portion 12 and adapted to receive the rear portion of the device to be held. The front plate 11 may be adapted to be fastened or attached to the base portion 12. The front plate 11 may further comprise a plurality of apertures 111, 112, 113, 114 adapted to fasten the base portion 12 to the front plate 11 and/or to a mounting bracket 1242 and 126. Understandably, any known fastener or method to attach the front plate 11 to the base portion 12 may be used such as bolts and nuts. Understandably, any other suitable fastening method known in the art may be used.

Figure 3:
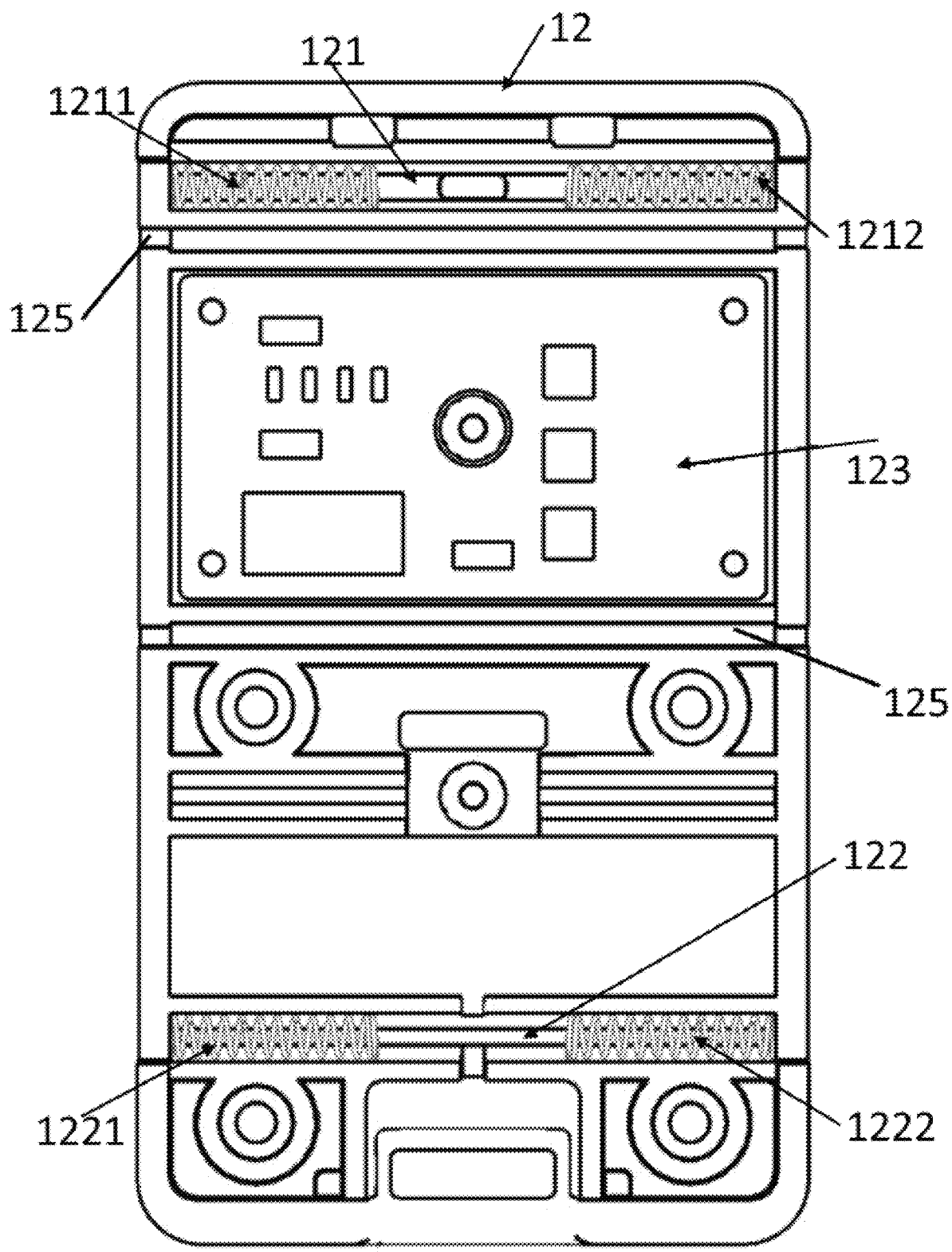
FIG. 3 is a front elevation view a smart device holder in accordance with the principles of the present invention shown without a base plate.
Figure 10:
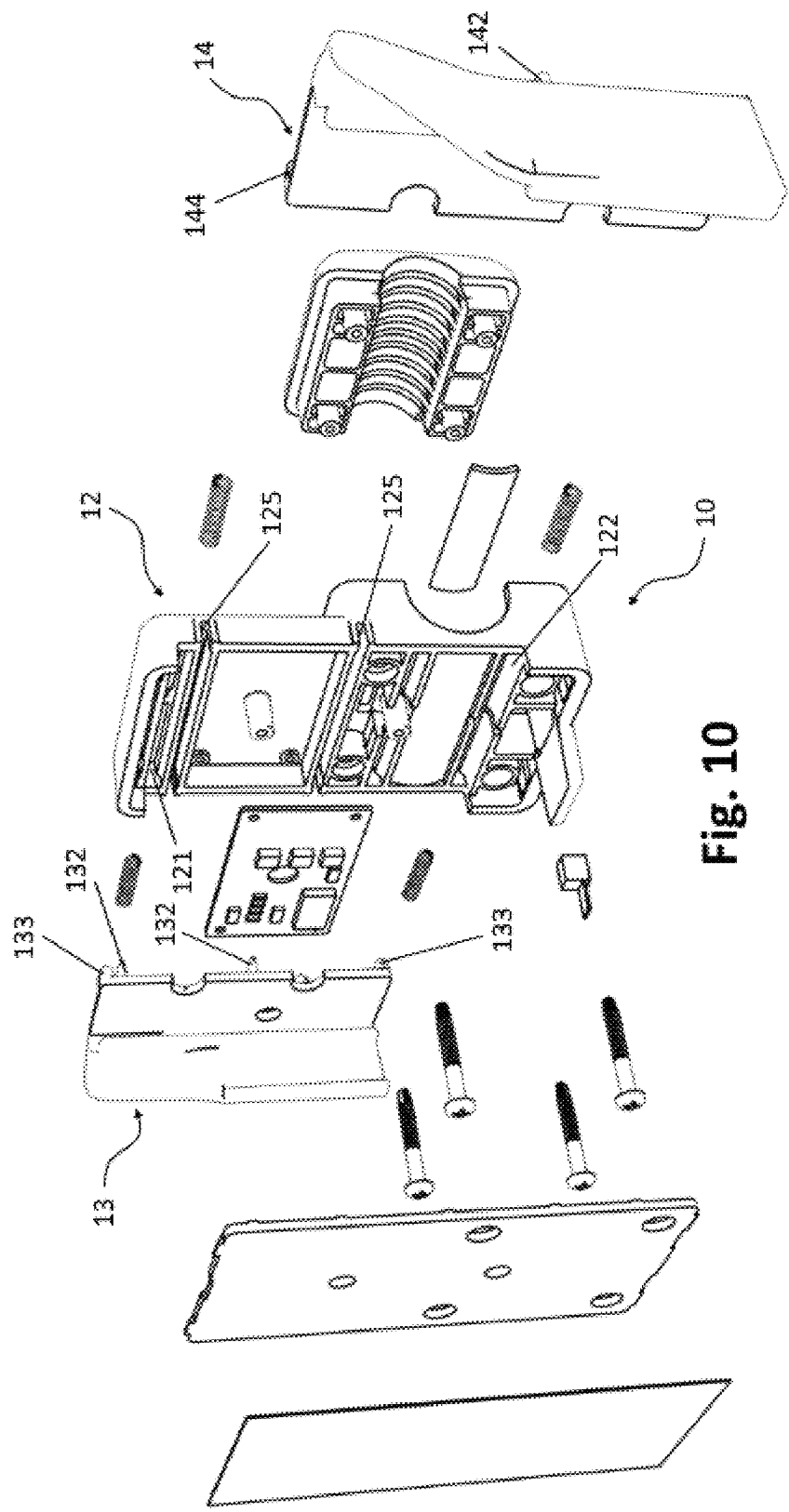
FIG. 10 is an exploded perspective view of the device holder of FIG. 1 shown with a circuit board

Now referring to FIGS. 3 and 10, an exemplary base portion 12 is shown. The base portion comprises hollow portions, such as two closed-end slots 121, 122, adapted to receive a resilient member, such as pairs of springs 1211 1212 and 1221, 1222 pushing against side walls of the base portion 12. In embodiments having hollow portions 121, 122, each side member 13, 14 comprises at least one protruding member 133, 144 aligned to be received in-between the resilient members of the hollow portion 121, 122. As each side member 13, 14 are pushed away from one another, a force is applied on the resilient member. When the device is removed from the holder 10, the resilience force of the resilient member pulls the side member 13, 14 toward one another.

The base portion 12 may further comprise one or more alignments sections 125 adapted to receive a compatible alignment sections 132, 142 of the side members 13 and 14. In some embodiments, the base portion 12 comprises generally horizontal slots 125 adapted to receive one or more protruding members 132, 142 of the side members 13 and 14. Such alignment portions generally aims at vertically maintaining the side members 13 and 14 with regard to the base portion 12.

In embodiments where the resilient member is a pair of springs 1211, 1212 and 1221, 1222, the two side plates 13, 14 are adapted to slide toward each another by pressing the springs. In the non-used state, the springs are relaxed.

In other embodiments, the holder 10 may comprise a circuit board or controller 123. In yet other embodiments, as shown in FIGS. 3 and 10, the circuit board 123 may be installed in a hollow portion of the base portion 12. The circuit board 123 may comprise a communication module adapted to send and receive data with other computerized devices. The communication module may be configured to communicate with networks supporting near-field communication (NFC) protocols, Bluetooth™ protocols, wireless data protocols and/or radio frequency identification devices (RFID). Understandably, the controller or circuit board may further comprise Wi-Fi, USB, Bluetooth™, NFC and/or any other communication controller.

In some embodiments, the circuit board 123 may comprise an anti-theft or remember me alarm circuit adapted to communicate with the device inserted in the holder 10. In such embodiments, the controller 123 may be configured to establish a communication link with the inserted device. The controller 123 or device may be configured to keep the communication alive. When the communication link is lost or broken, the controller 123 may be configured to trigger an alarm or to request the device to emit a sound.

The circuit board may also comprise a charging port connection, such as a USB port and/or a battery (not shown in the Figures) adapted provide electrical current to the inserted device.

Figure 4:
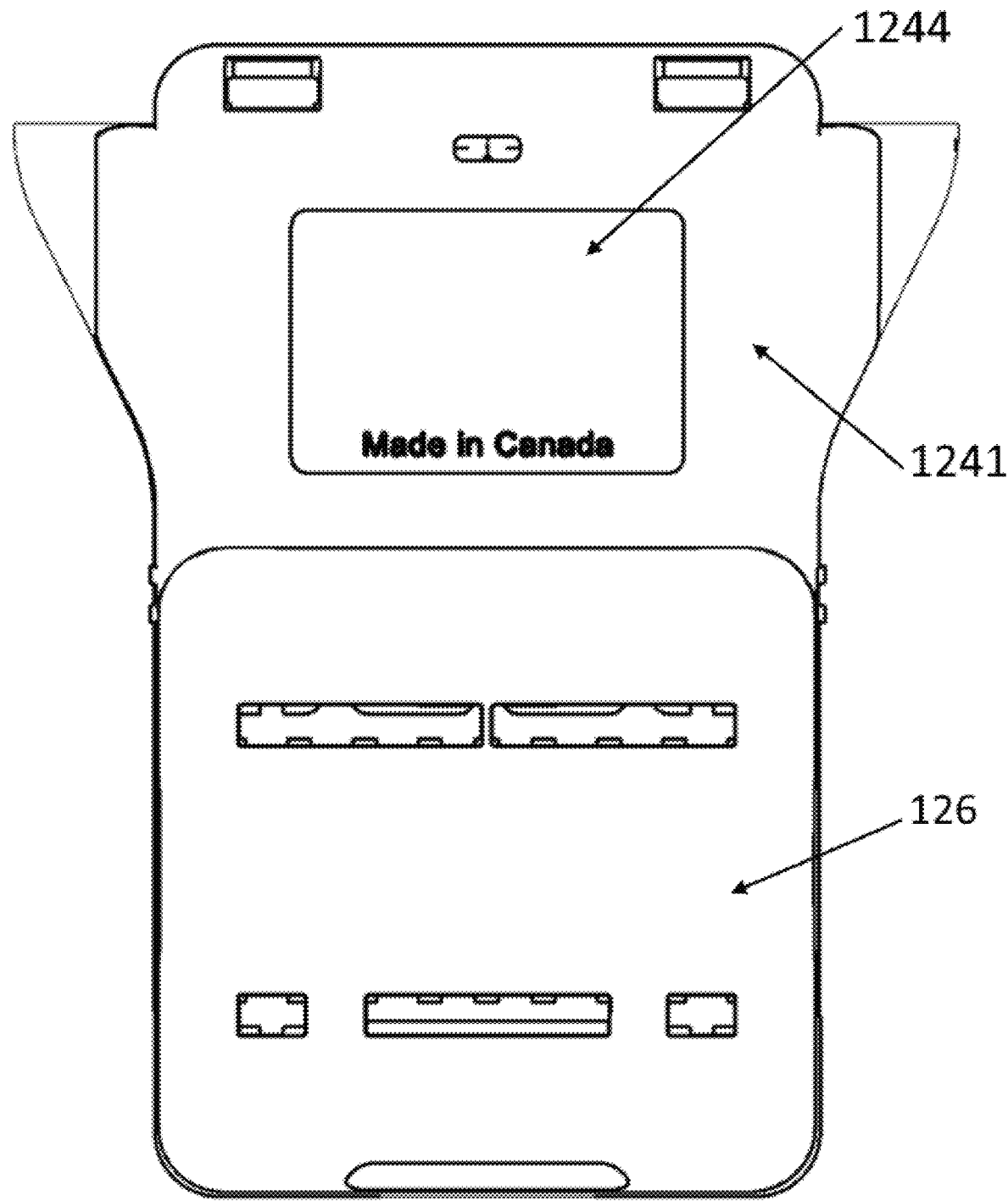
FIG. 4 is a rear plan view of the smart device holder of FIG. 1.

Now referring to FIGS. 1 and 4, in some embodiments, the holder 10 is adapted to be mounted to an external member, such as a shopping cart handle or any other type of handle. In such embodiments, the body portion 12 comprises a mounting section 1242. The holder 10 typically comprises a complementary mounting portion 126. In a preferred embodiment, the mounting portion 1242 comprises a section shaped to be received by at least a portion of the external member (i.e. shopping cart handle) and the complementary mounting portion 126 comprises a section shaped to be received by at least some of the remaining portion of the receiving member (see FIG. 10). Understandably, any other known method or mechanism for mounting the device holder 10 to an external member may be used.

Figure 5:
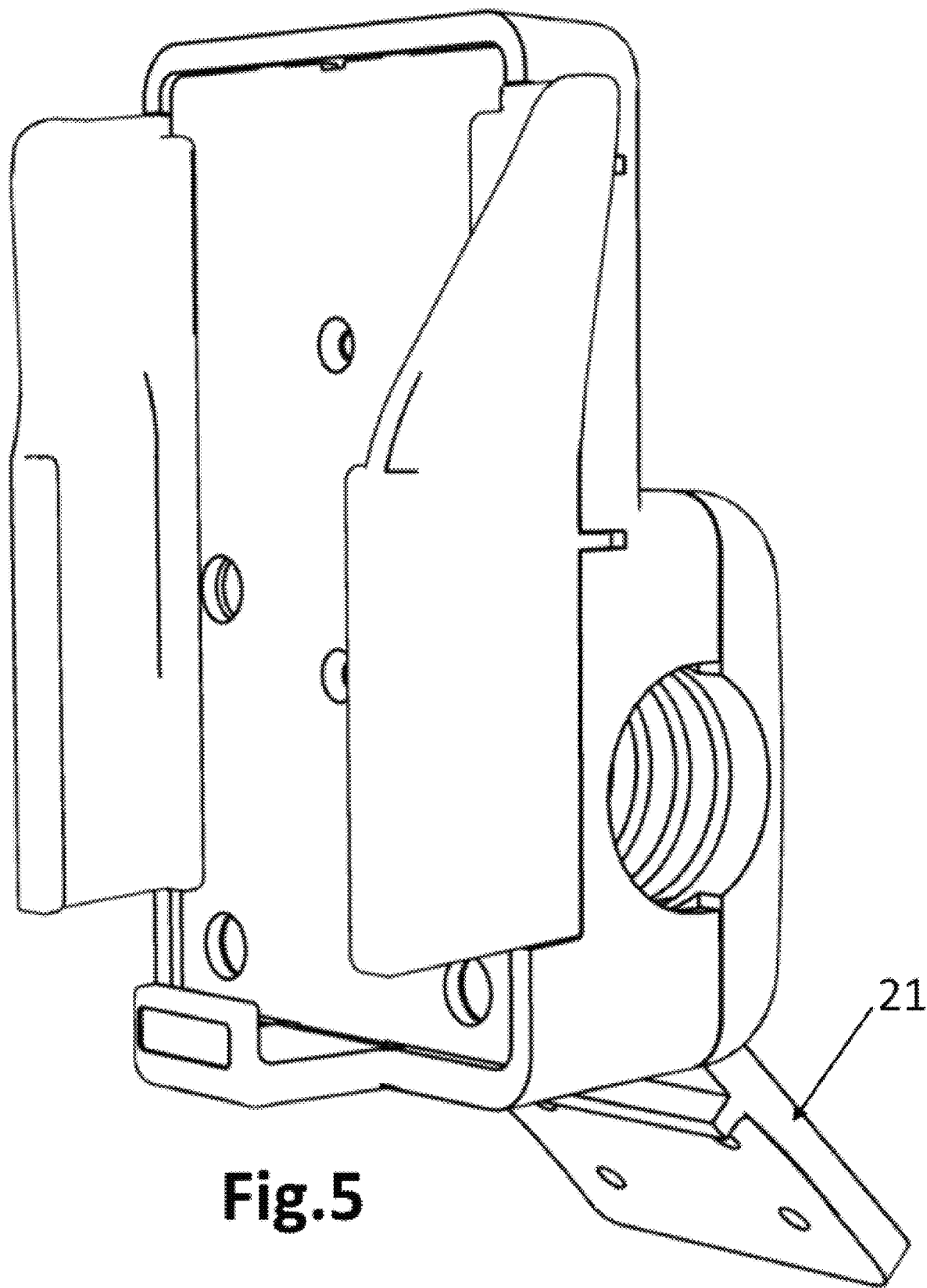
FIG. 5 is a front right perspective view of an embodiment of a smart device holder comprising a bracket in accordance with the principles of the present invention.
Figure 6:
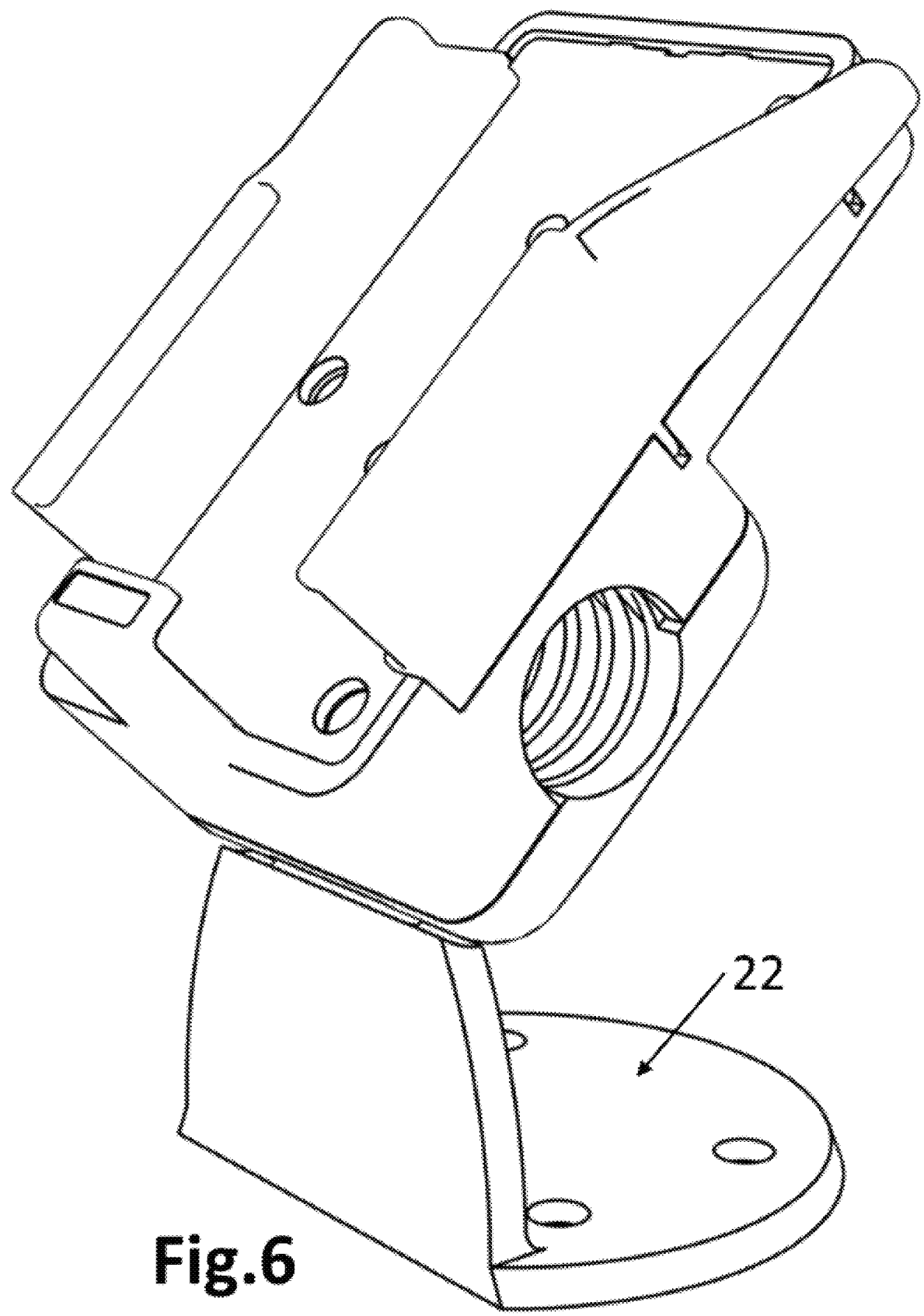
FIG. 6 is a front right perspective view of an embodiment of a smart device holder comprising a flat stand base bracket in accordance with the principles of the present invention.
Figure 7:
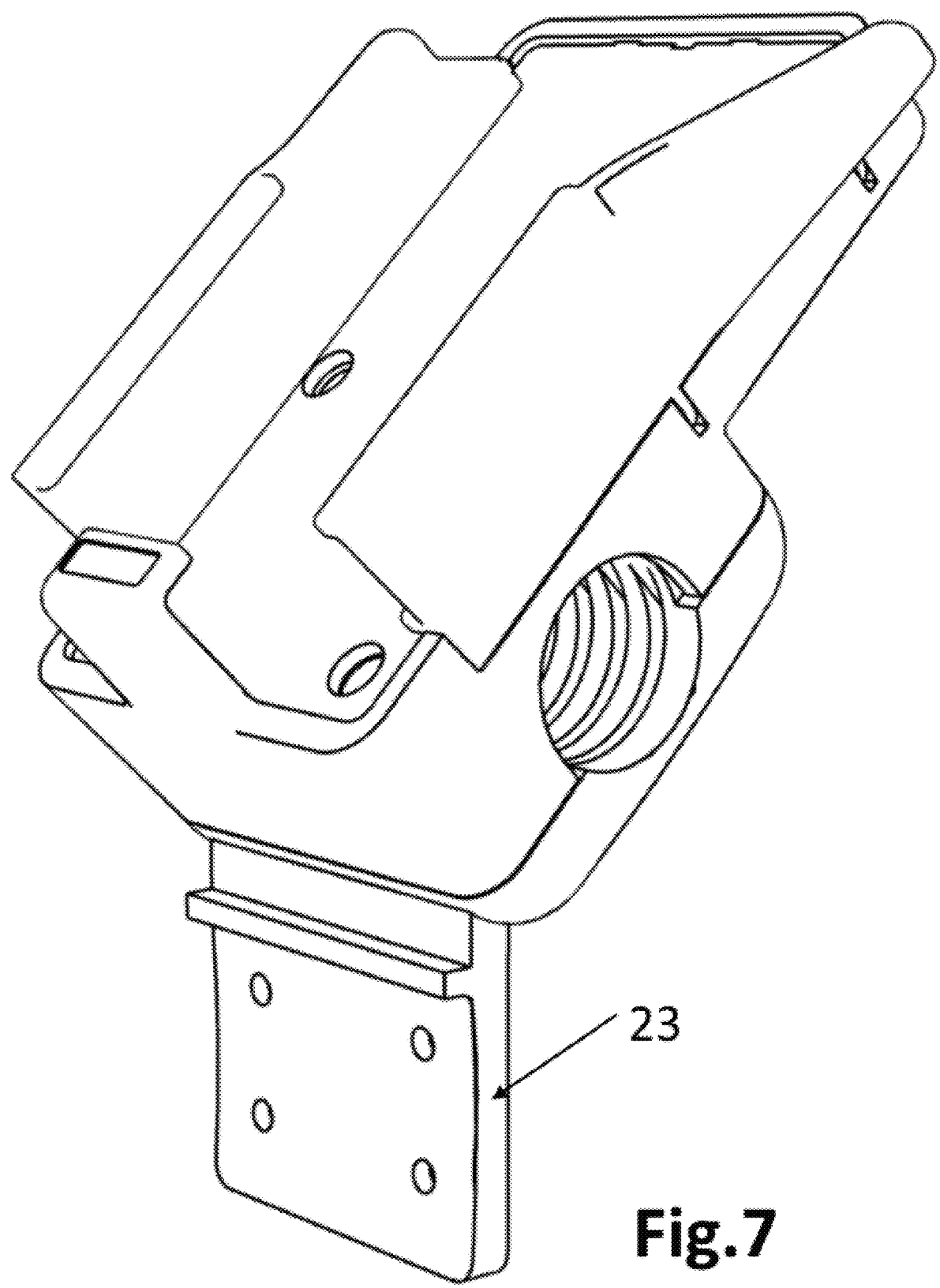
FIG. 7 is a front right perspective view of an embodiment of a smart device holder comprising a vertical bracket in accordance with the principles of the present invention.

Now referring to FIGS. 5, 6 and 7, in some embodiments, the holder 10 may be adapted to be mounted to different types of accessories. Referring to FIG. 5, a holder 10 comprising a surface bracket 21 is shown. Referring to FIG. 6, a holder 10 comprising a flat stand base 22 is shown. Referring to FIG. 7, an exemplary holder 10 comprising a vertical bracket 23 is shown. Understandably, the bracket structure is not limited to the above illustrated structure, and any other bracket structures which can keep the smart device holder in place known in the art may be used. The user may choose different brackets according to the environment. The brackets have a function to support and fix the smart holder into a desired location place.

Figure 8:
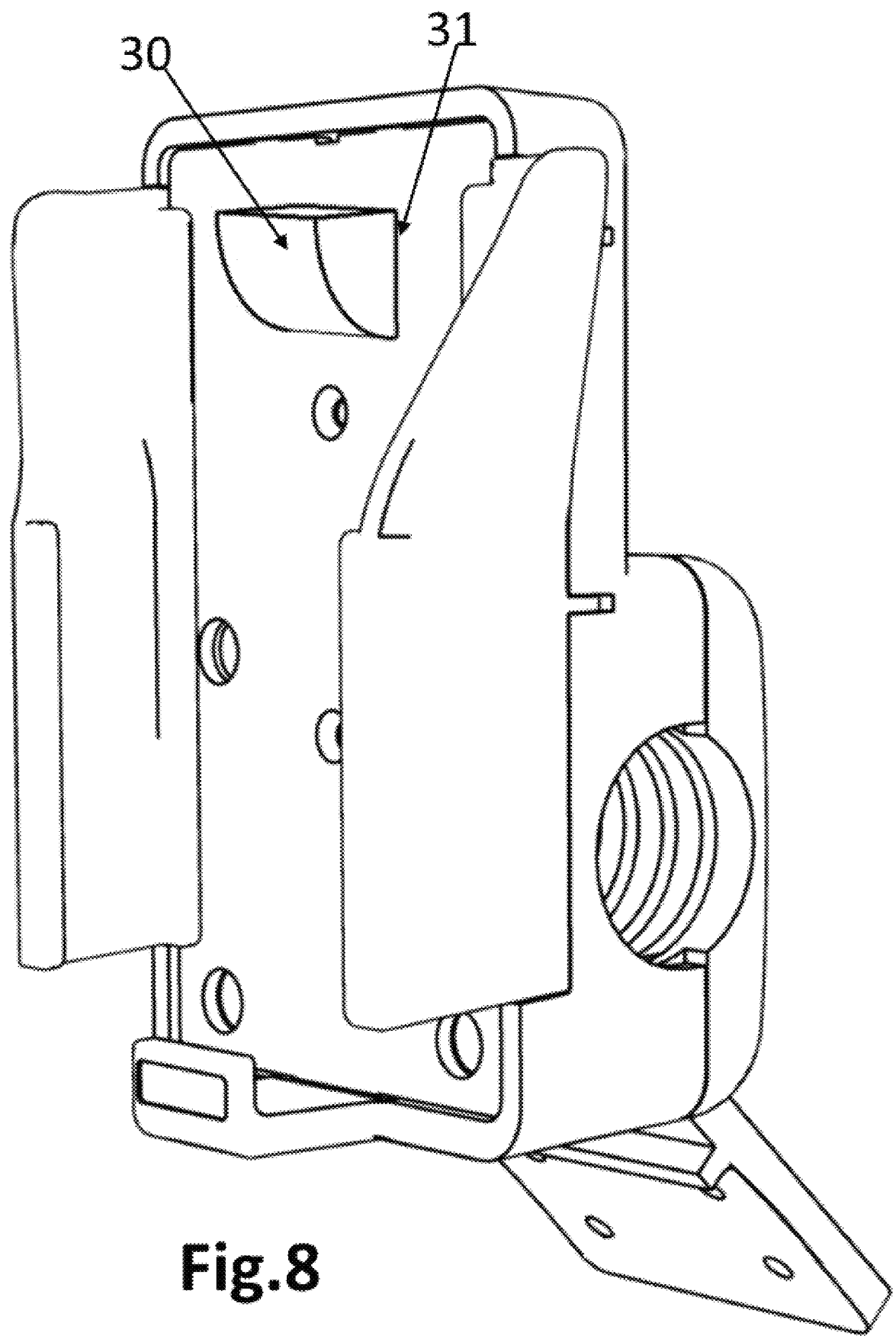
FIG. 8 is a front right perspective view of an embodiment of a smart device holder comprising a surface bracket and a protruding tab in according with the principles of the present invention.
Figure 9:
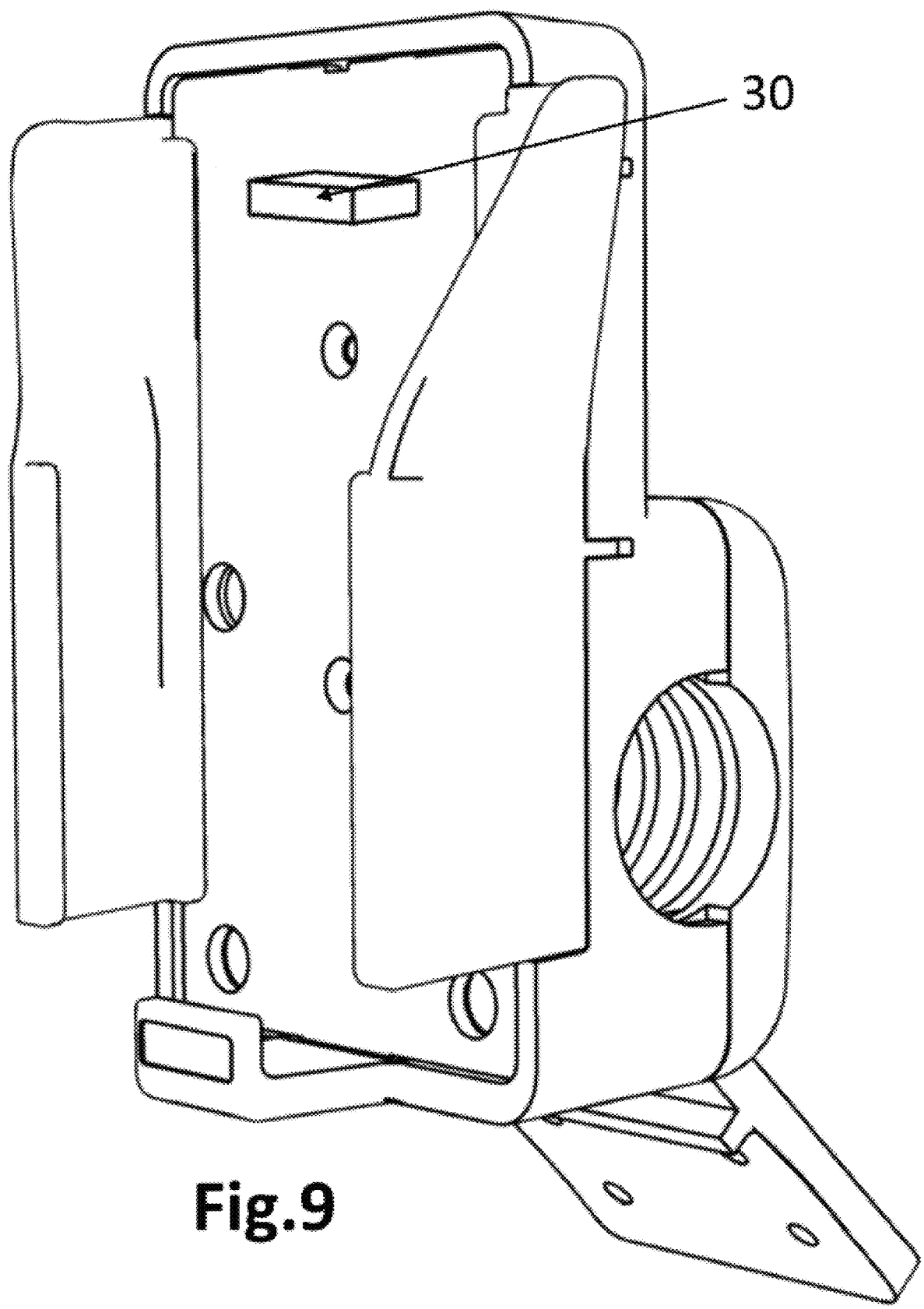
FIG. 9 is a front right perspective view of an embodiment of a smart device holder comprising a surface bracket and a second embodiment of a protruding tab in accordance with the principles of the present invention.

Now referring to FIG. 8, in some embodiments, the smart device holder 10 further comprises a protruding tab 30 generally located on the front plate 11. The protruding tab 30 may be any shaped tab known in the art to protect the device slide away from the smart device holder 10. In a preferred embodiment illustrated in FIG. 8, the protruding tab 30 has a shape with one quarter of cylinder. The protruding tab 30 may be pressed into the aperture 31 located in the front plate 11 and the base plate 12. When the user wants to insert the device into the smart device holder 10, the protruding tab 30 may be pressed which facilitates the insert of the device or detects the presence of the device. Another preferred embodiment of the protruding tab is illustrated in FIG. 9, the protruding tab 31 is generally shaped as a rectangle. Understandably, any other shaped protruding tab known in the art may be used only if a corresponding aperture 31 is located in the front plate 11 and the base plate 12.

Figure 11:
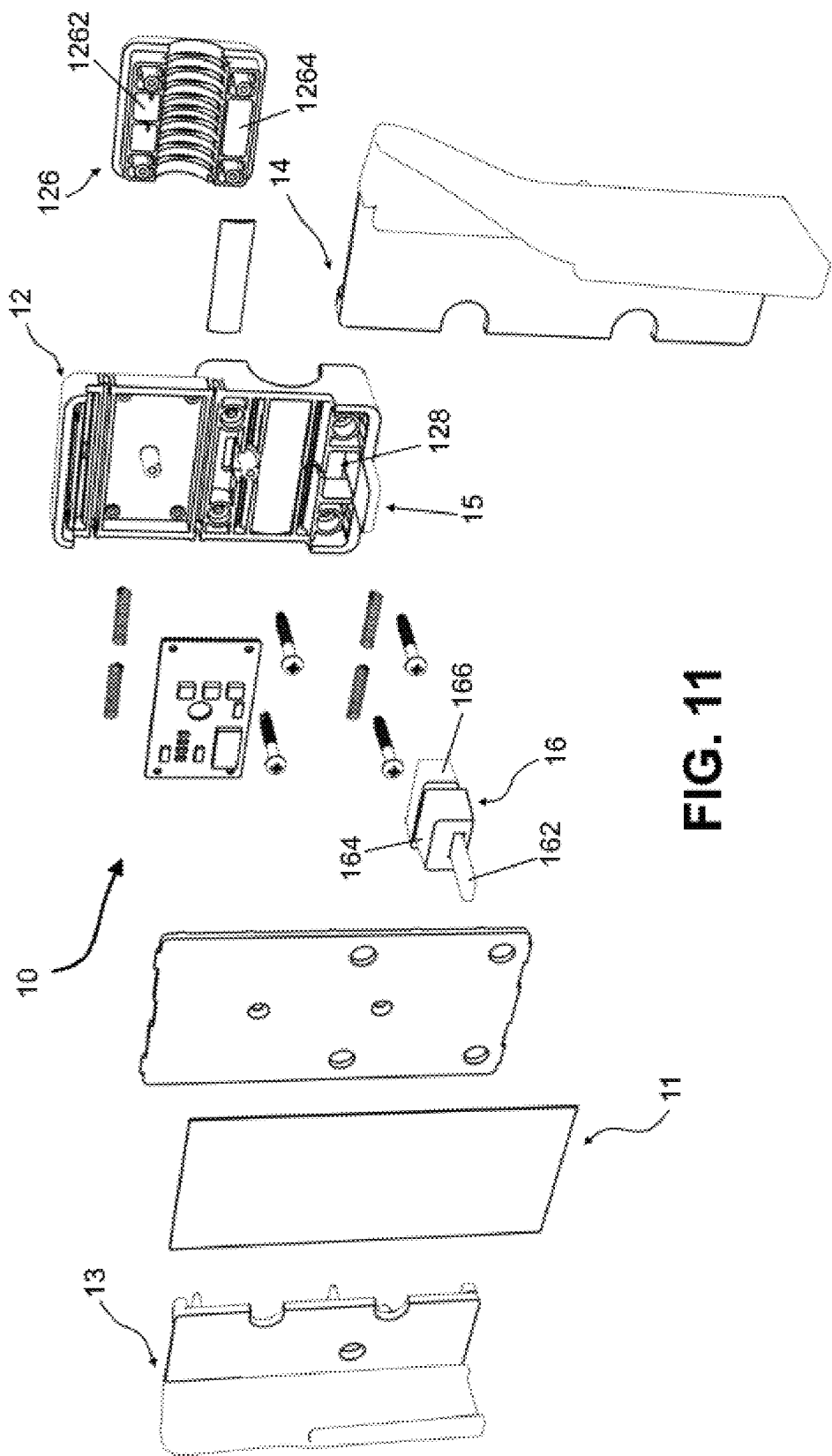
FIG. 11 is an exploded perspective view of the device holder of FIG. 1 shown with a circuit board and a switch.

Now referring to FIG. 11, in some embodiments, the smart device holder 10 comprises a switch 16 configured to detect if a device is present on the device holder 10. In some embodiments, the switch 16 comprises a controller or central processing unit powered by an electrical source, such as a battery. The switch 16 is adapted to communicate the status of the switch 16 to the circuit board 123. In yet some embodiments, the switch 16 further comprises a wireless communication module, such as a BLUETOOTH® module, controlled by the central processor of the switch 16. The wireless communication module may be configured to connect with the circuit board 123 and to wirelessly send the switch 16 status to the circuit board 123. In use, when a user inserts a mobile device in the device holder 10, the switch 16 is pushed by the computerized device, the status of the switch 16 is then changed to "closed" and such status is communicated to the circuit board.

In such embodiments, the mounting bracket 126 is adapted to receive the switch 16. The base plate 12 may further comprise an aperture or passage 128 adapted to allow the switch 16 to be protrude from the base plate 12. In yet other embodiments, the switch 16 comprises a push button 162, a protruding portion 164 and a base portion 166. The push button 162 is typically adapted to be resiliently pushed within the protruding portion 164 and/or the base portion 166. The base portion 166 is typically received by a recess portion 1264 of the mounting bracket and the protruding portion 164 is inserted within the passageway 128 to expose the push button 162 out of the base plate 12 and/or cover 11.

The mounting bracket 126 may further be adapted to receive a portable power source, such as batteries, to power the circuit board 123 and/or the switch 16. In yet other embodiments, the mounting bracket 126 comprises a recess portion 1262 adapted to receive one or more portable power source.

The switch 16 may be used to power the circuit board 123 only when a device is present on the holder. In such embodiments, the circuit board 123 is maintained in sleep mode when the switch 16 status is open. When the switch 16 is closed (i.e. button is pushed), the circuit board 123 wakes up from the sleep mode and connects with the inserted device.

In yet other embodiments, the circuit board 123 may be configured to execute instructions to communicate with the device when the switch is closed. The device may be configured to execute a program to establish a virtual security lock with the holder 10. In some embodiments, the program is configured to command the device to emit sounds or alarms if the mobile device is removed from the device holder 10 when the security lock is activated. To remove the device from the holder 10 without breaking the security lock, a user must first deactivate the said virtual security lock and then pull the mobile device from the holder 10.

In some embodiments, a code is provided or displayed to the user on the mobile device when the virtual security lock is established with the holder 10. To disengage the virtual security lock, a user shall enter the said code in the mobile device. When the virtual security lock is deactivated, the user may safely remove the mobile device from the holder 10. Understandably, any other method to establish and deactivate the virtual security lock may be used without departing from the scope of the present invention, such as the program triggering a built-in security measure of the mobile device or by using voice recognition module adapted to react only to the user voice to activate and deactivate the virtual security lock.

In yet other embodiments, if the mobile device is removed from the holder 10, the user may deactivate the alarm or emitted sounds by entering the said code or by using any means used to disengage the virtual security lock.

The holder 10 may further be configured to track the location of the inserted device. In such embodiments, localization data is retrieved by the holder 10 through a GPS module or through the localization data from the inserted device. Based on the location of the device, the holder 10 may be configured to propose location-based advertisement or promotions based on the said position.

In embodiments comprising a controller, the holder 10 may further be configured to act as a payment gateway. As such, at time of payment, the inserted device is configured to communicate with the controller 123. The controller is configured to communicate with a payment platform through a network.

The controller may further be configured to act as a server to display a web interface or media interface on the inserted device.

Figures 12, 13:
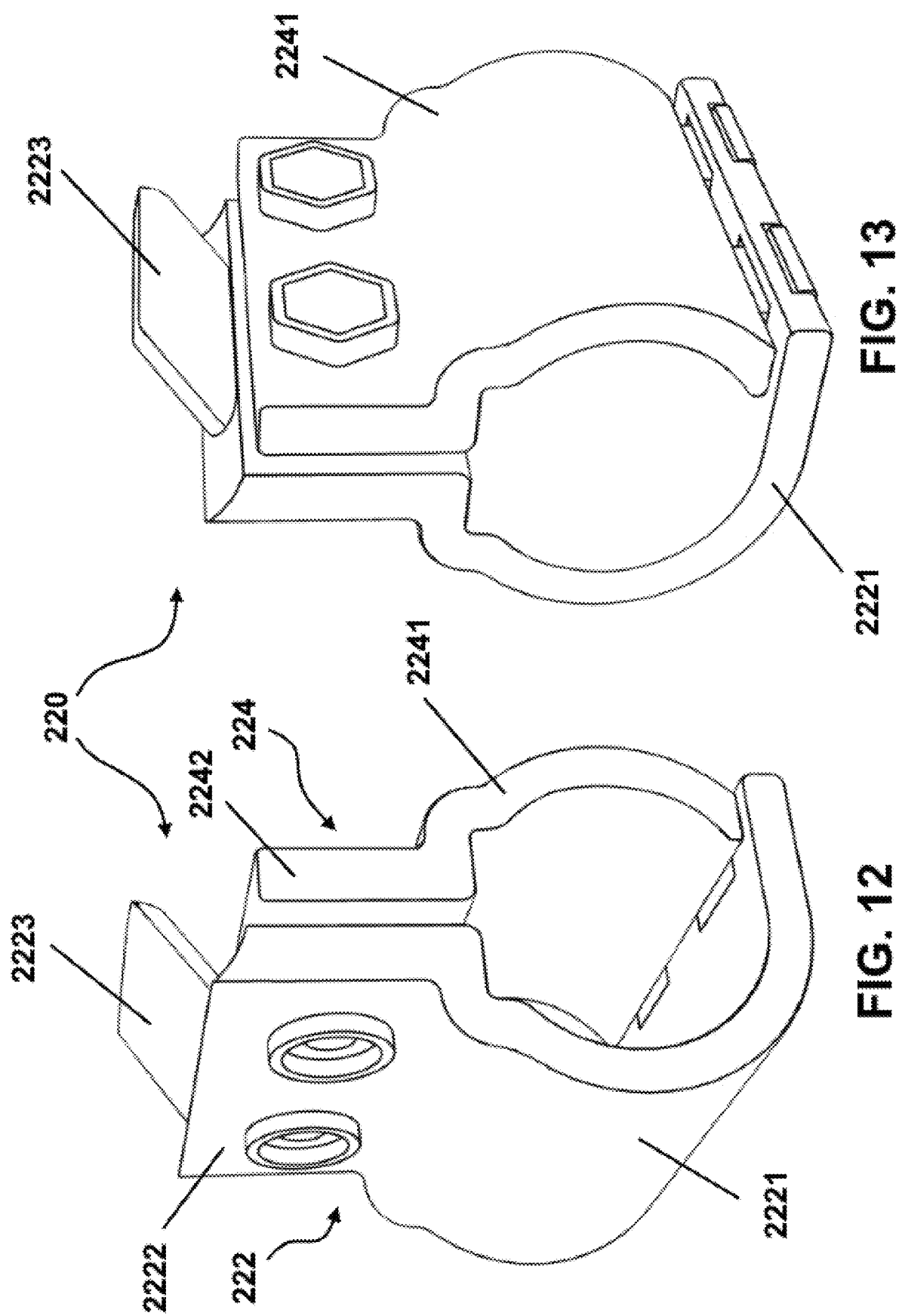
FIGS. 12 and 13 are perspective views of another embodiment of a mounting member in accordance with the principles of the present invention.
Figure 14:
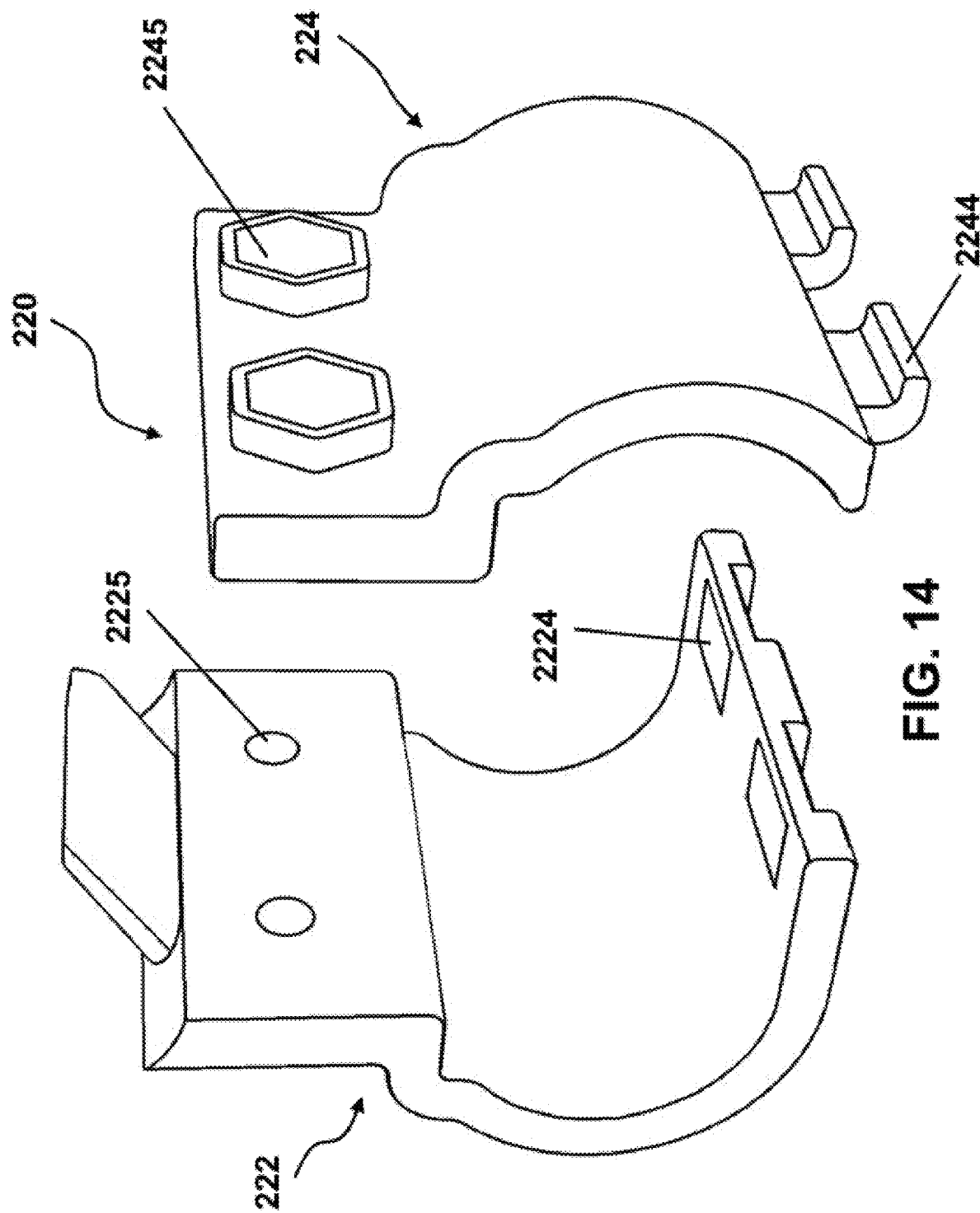
FIG. 14 is an exploded perspective view of the mounting member of FIGS. 12 and 13.

Referring now to FIGS. 12 to 14, another embodiment of a mounting section 220 is shown. Such embodiment of the mounting section 220 is generally shaped as a closable C-clamp. In some embodiments, the mounting section 220 comprises two complementary portions 222 and 224. The first portion 222 generally comprises a lower curved section 2221 and an upper generally vertical section 2222. The first portion 222 further comprises an attachment section 2223 adapted to be attached or mounted to the main body of the holder 10. The second portion 224 also comprises a lower curved section 2241 and an upper generally vertical section 2242. The lower curved sections 2221 and 2241 are complementary couplable to form the generally periphery of the element to which the holder 10 needs to be attached. In the present example, when attached to one another, the two lower curved sections 2221 and 2241 form a generally cylindrical volume that may circumvent a cart handle.

The upper generally vertical sections 2222 and 2242 are also complementary attachable and are generally adapted to close the upper portion of the clamp 220. In some embodiments, the upper portions 2222 and 2224 further comprise complementary apertures 2225 and 2245 adapted to be aligned and to receive any type of fastener or attachment member (not shown).

The lower sections 2221 and 2241 may further comprise complementary retaining members 2224 and 2244. In the exemplary embodiment, the lower section 2221 of the first portion 222 comprises a female member or aperture 2224 and the lower section 2241 of the second portion 224 comprises a male connector 2244 adapted to be inserted and held into the female member 2224 when the upper sections 2222 and 2242 are attached to one another. Understandably, the present retaining members 2224 and 2244 and the complementary apertures 2225 and 2245 is provided as an example. Any other mean or mechanism to connect the two portions 222 and 224 may be used within the scope of the present invention.

Now referring to FIGS. 15 to 19, other embodiments of the holder 10 are illustrated. In such embodiments, the main body 12 may connected to different modules to provide added functionality.

Figure 15:
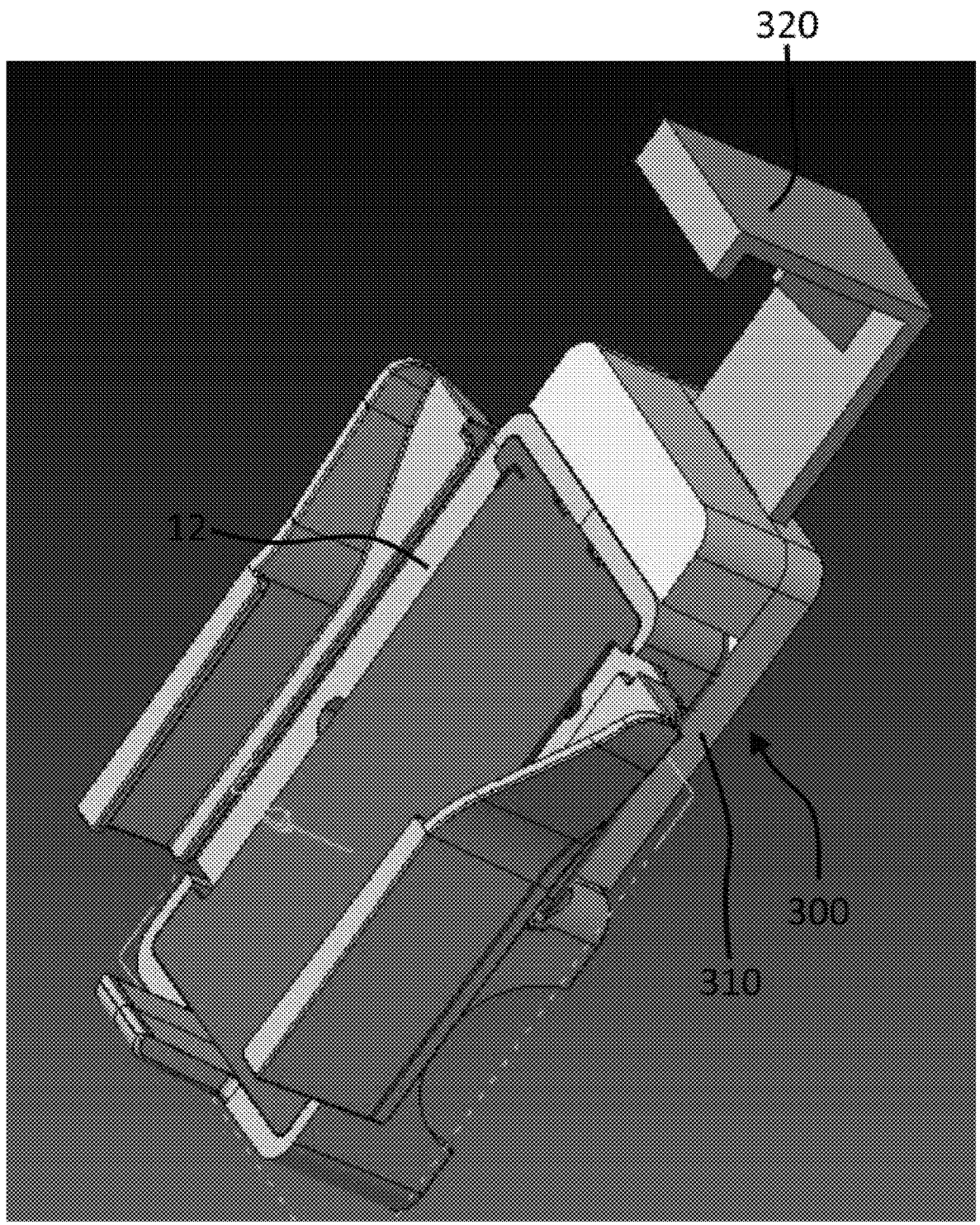
FIG. 15 is a perspective view of an embodiment of a smart device holder in accordance with the principles of the present invention, the smart device holder being shown with a computerized device retainer member having a L-tab.

Referring now to FIG. 15, an embodiment of the holder 10 comprises a computerized device retainer member 300. The device retainer member 300 may be embodied as a slidable L-plate adapted to retain the top of the computerized device upon insertion. This computerized device retainer member 300 may be mounted or secured to the main body 12 with any type of mounting element, such as, but not limited to, fasteners, clips, bolts, sliders, etc. In such embodiment, the device retainer member 300 comprises a body 310 conforming with the shape of the main body 12 of the device holder 10. The device retainer member 300 may further comprise a protruding element 320, such as a tab, extending from the top of the body 310. The protruding element 310 is adapted to move between an unlocked position and a locked position. In some embodiments, the protruding element 310 may slide in and out of the body 310. Once a computerized device is inserted in the holder 10, the top portion of the computerized device may be secured by sliding the tab 320 toward the computerized device.

In some embodiments, the device retainer member 300 may be secured or locked in place using any known securing or locking mechanism, such as but not limited to a side slider blocking the movement of the protruding member 320. In such embodiments, the device retainer member 300 generally aims at adapting to any size and/or shape of computerized device.

Figure 16:
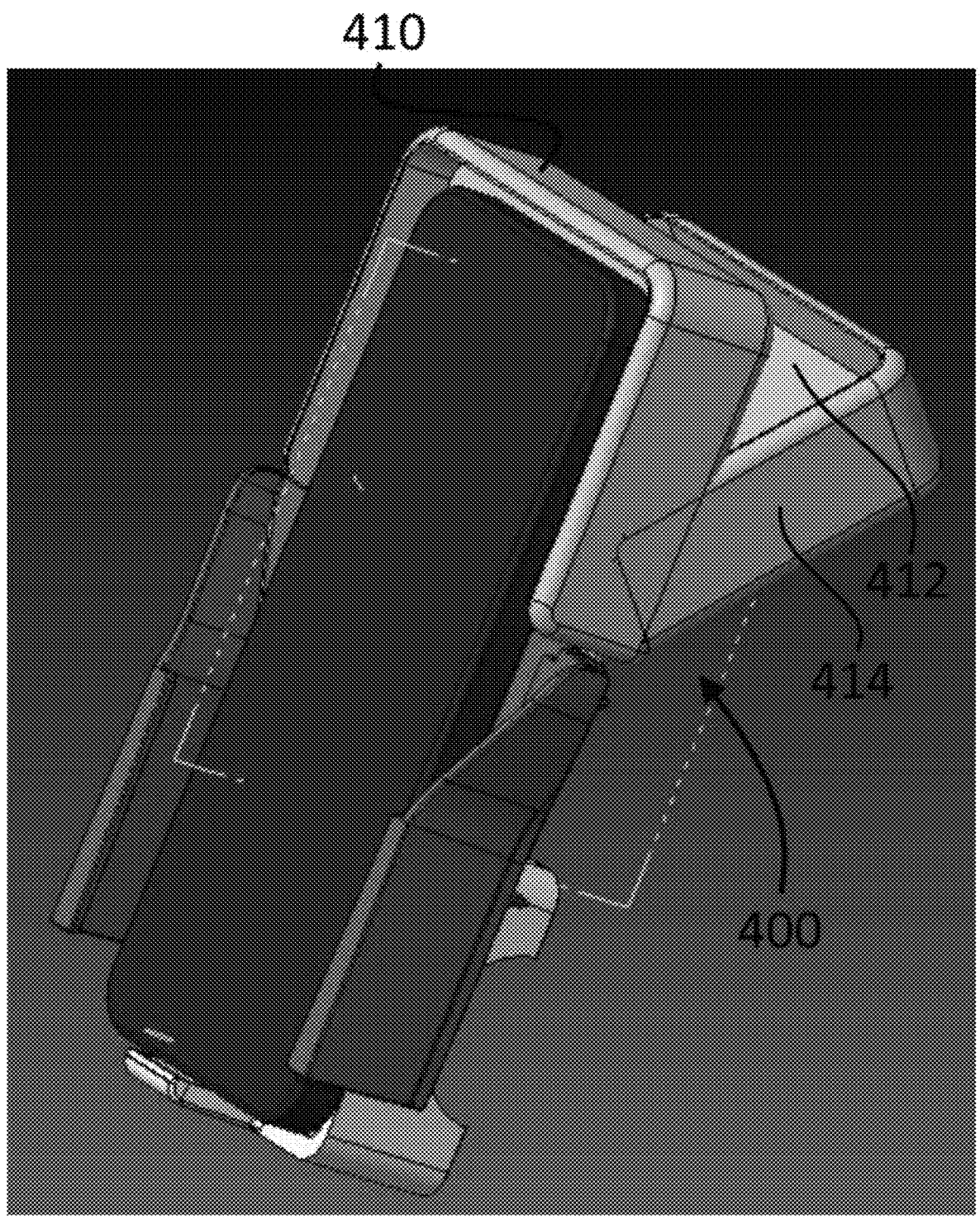
FIG. 16 is a front perspective view of an embodiment of a smart device holder in accordance with the principles of the present invention, the smart device holder being shown with a computerized device retainer member comprising a rotatable and slidable portion
Figure 17:
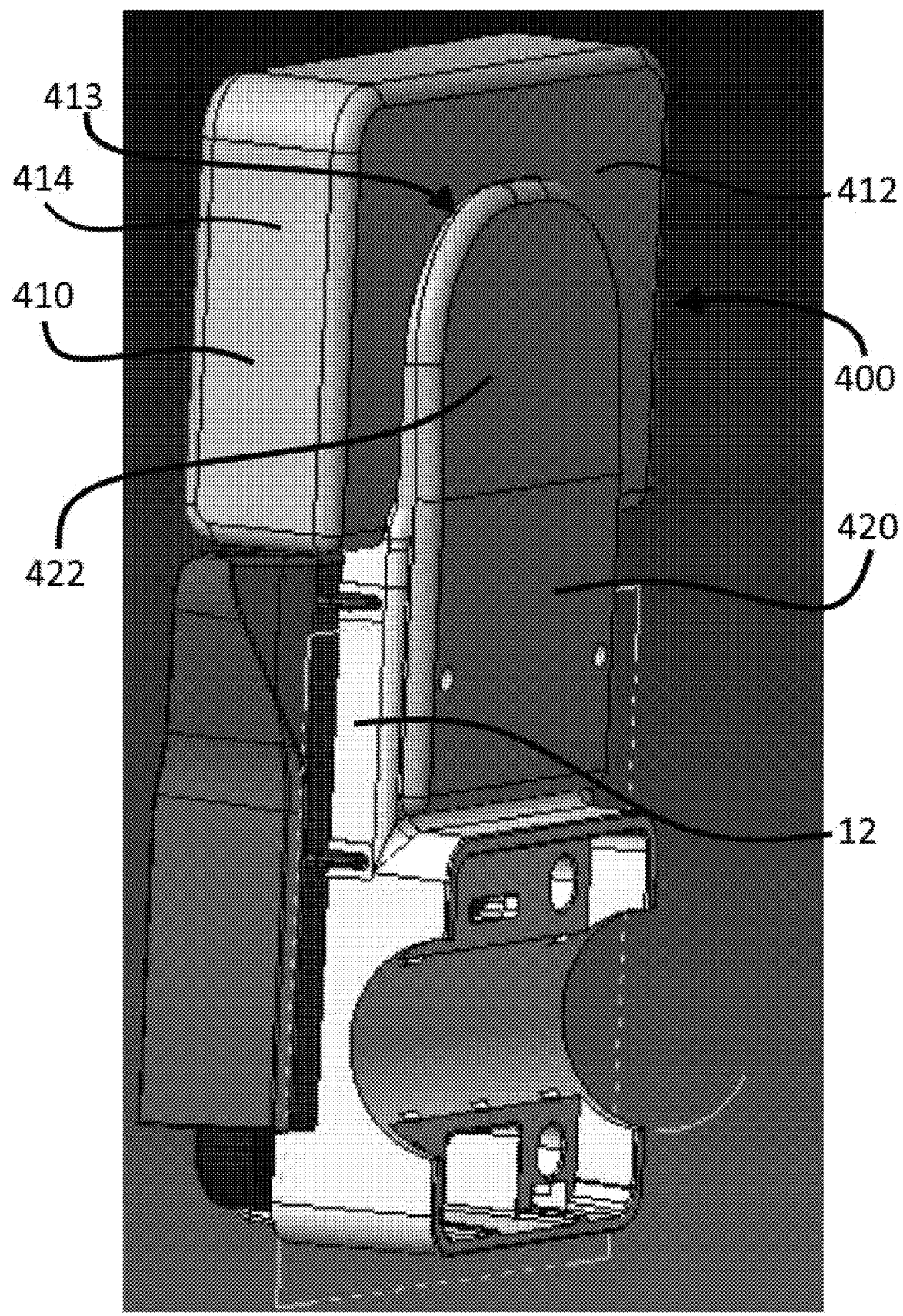
FIG. 17 is a rear perspective view of the smart device holder of FIG. 16.

Referring now to FIGS. 16 and 17, another embodiment of a device retainer member 400 pivotally mounted on the holder 10 is illustrated. The device retainer member 400 generally comprises a top portion 410 pivotally mounted to a lower portion 420. In the illustrated embodiment, the top portion 410 comprises a back plate 412 and side walls 414. The back plate 412 generally aims at receiving the rear portion of the computerized device while the side walls 414 generally aim at maintaining the computerized device secured.

The lower portion 420 is mounted to the body 12 of the holder 10. The lower portion 420 comprises an upper portion 422 having a shape matching the shape of an opening 413 in the back plate of the top portion 410. The opening 413 allows the top portion 410 to freely pivot with regard to the back portion.

In some embodiments, the top portion 410 may move away and toward the lower portion 420. As an example, the top portion 410 may be adapted to slide up and down and to rotate forward and backward in relation to the lower portion 420. The lower portion 420 may be secured to the main body 12 using any means known in the art, such as but not limited to fasteners, clips, bolts, sliders, etc.

Figure 18:
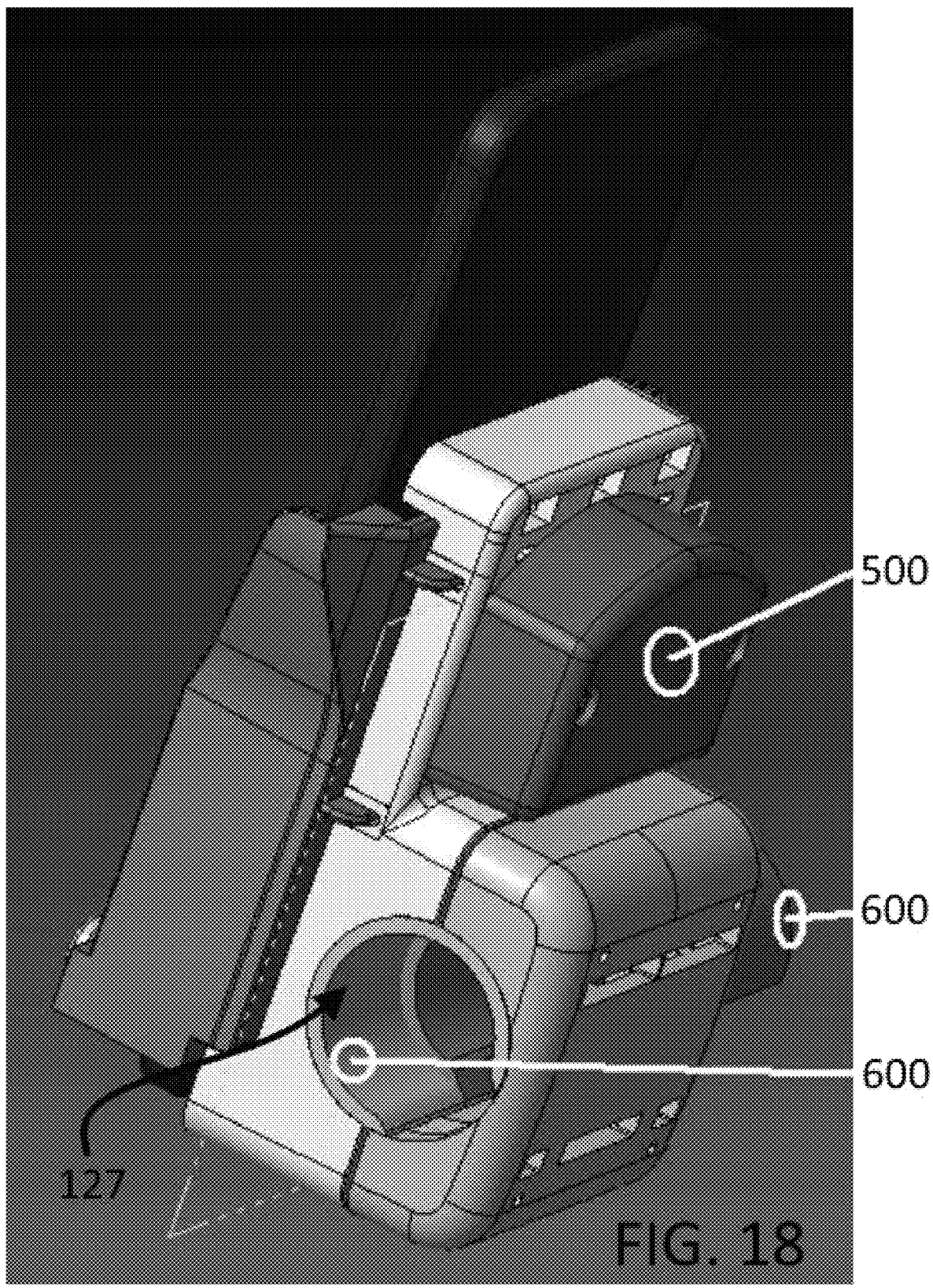
FIG. 18 is a rear perspective view of an embodiment of a smart device holder in accordance with the principles of the present invention, the smart device holder being shown with a retaining member comprising a device retainer member having a housing.
Figure 19:
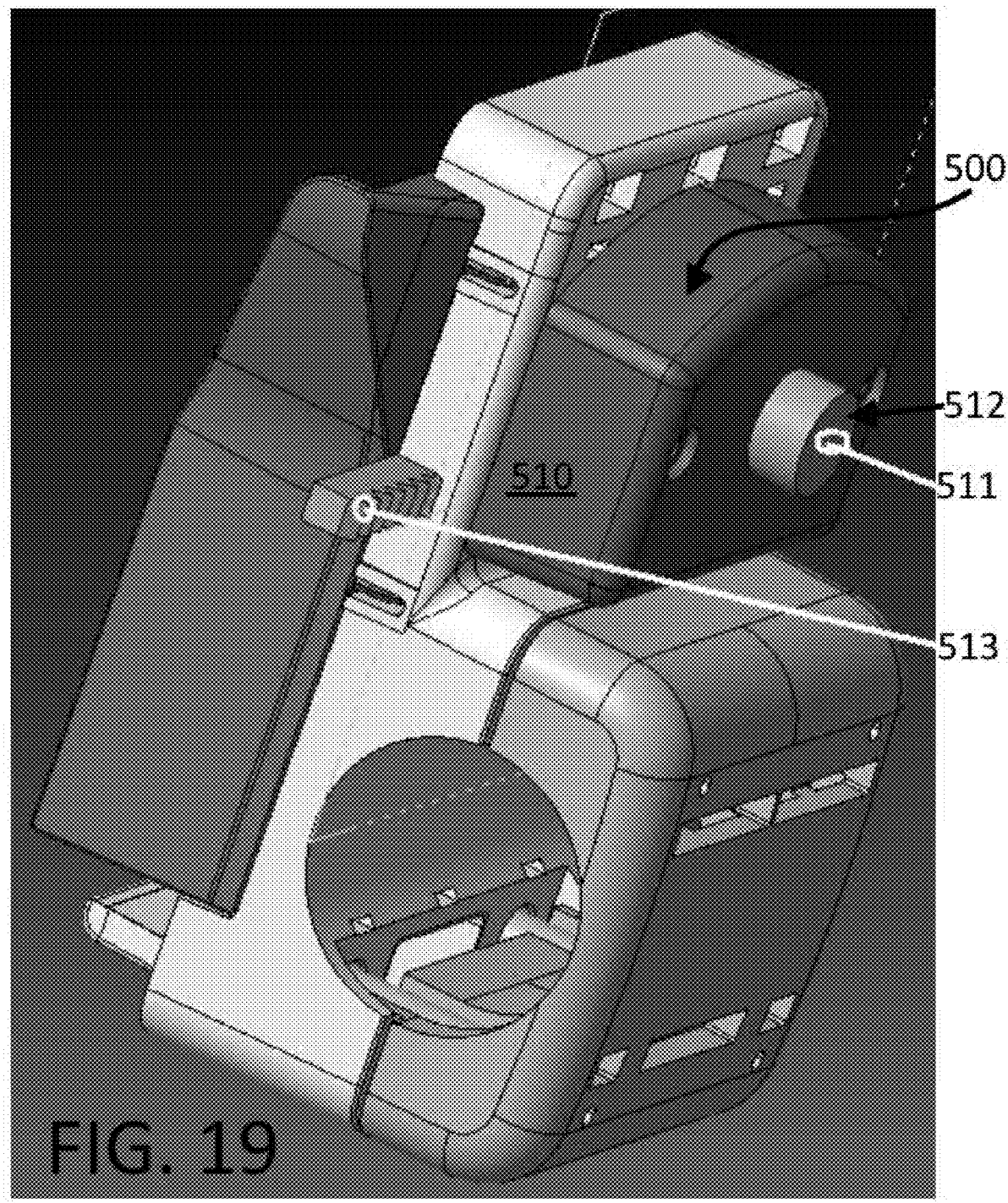
FIG. 19 is a rear perspective view of the smart device holder of FIG. 18, the retaining member being shown with a ratchet mechanism.

Now referring to FIGS. 18 and 19, another embodiment of a device retainer member 500 is illustrated. The device retainer member 500 comprises a housing 510 secured or attached to the back of the holder 10 or to the back of the main body 12 using any means, such as but not limited to fasteners, clips or bolts. The device retainer member 500 further comprises a ratchet mechanism 512, a knob 511 and rails 513. When the knob 511 is activated, such as pushed or pulled, the ratchet mechanism 512 may freely move outwardly from the rails 513. By deactivating or releasing the knob 511, the ratchet mechanism 512 is locked in placed, thus locking the side plates 13 and 14 in place. To unlock the side plates 13 and 14, the knob 511 or button shall be pressed and the ratchet shall be moved outwardly from the body 12 of the holder 10.

Referring back to FIG. 18, the mounting bracket 1242 and 126 may be shaped to fit different shaped external members. In some embodiments, the mounting bracket 1242 or 126 further comprises a friction layer 127, such as rubberized layer. The friction layer 127 is inserted between the mounting brackets portions 1242 and 126 over the external member 600. The friction layer 127 is generally shaped to conform with the corresponding inner surfaces of the mounting bracket 1242 and 126. In an embodiment, the inner shape of a friction layer 127 may be rounded as to fit with a round handle 600. In another embodiment, the inner shape or a friction layer 600 may be D-shaped to fit with a D shaped handle. Understandably, the friction layer 600 may be flexible to conform with the outside shape of the external member 600.

Figure 20:
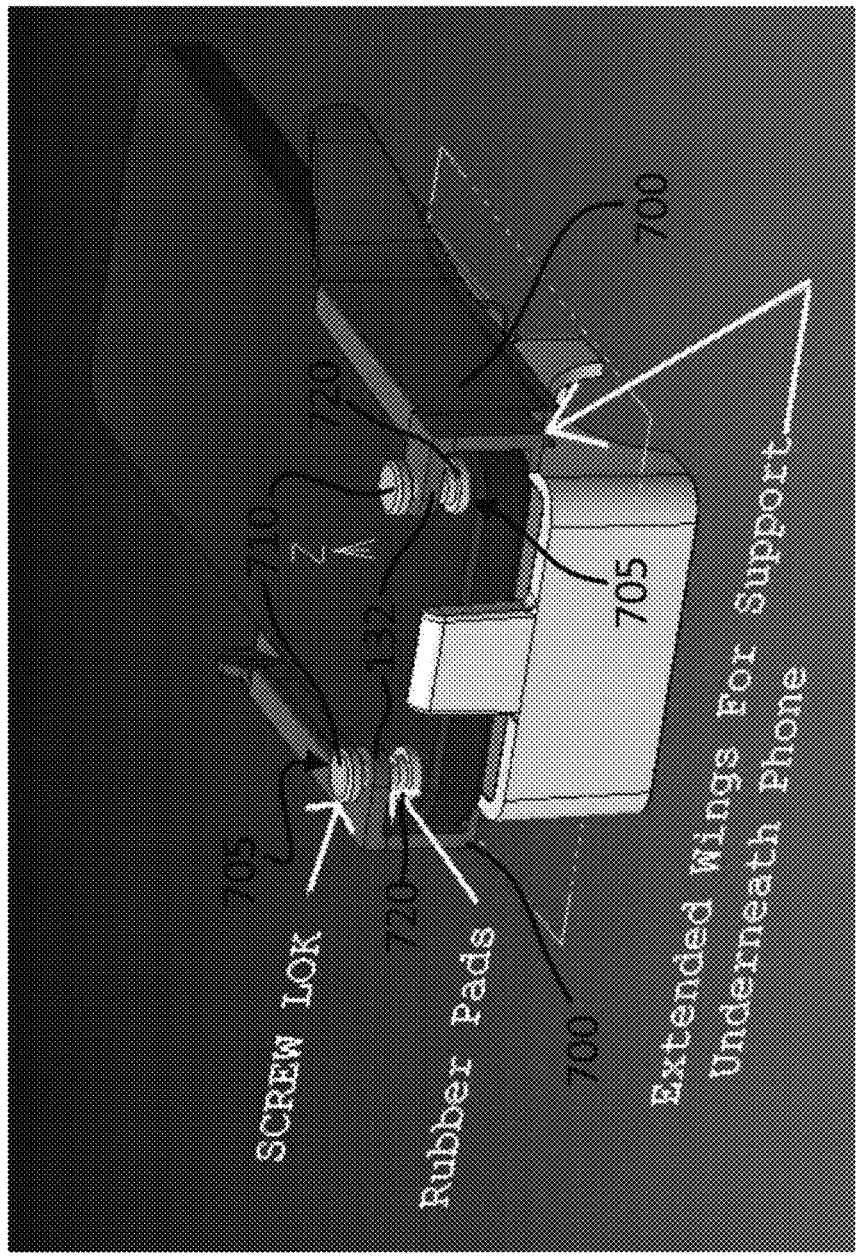
FIG. 20 is a bottom perspective view of an embodiment of a smart device holder in accordance with the principles of the present invention, the smart device holder being shown with resilient members on the side plates comprising rubber pads.
Figure 21:
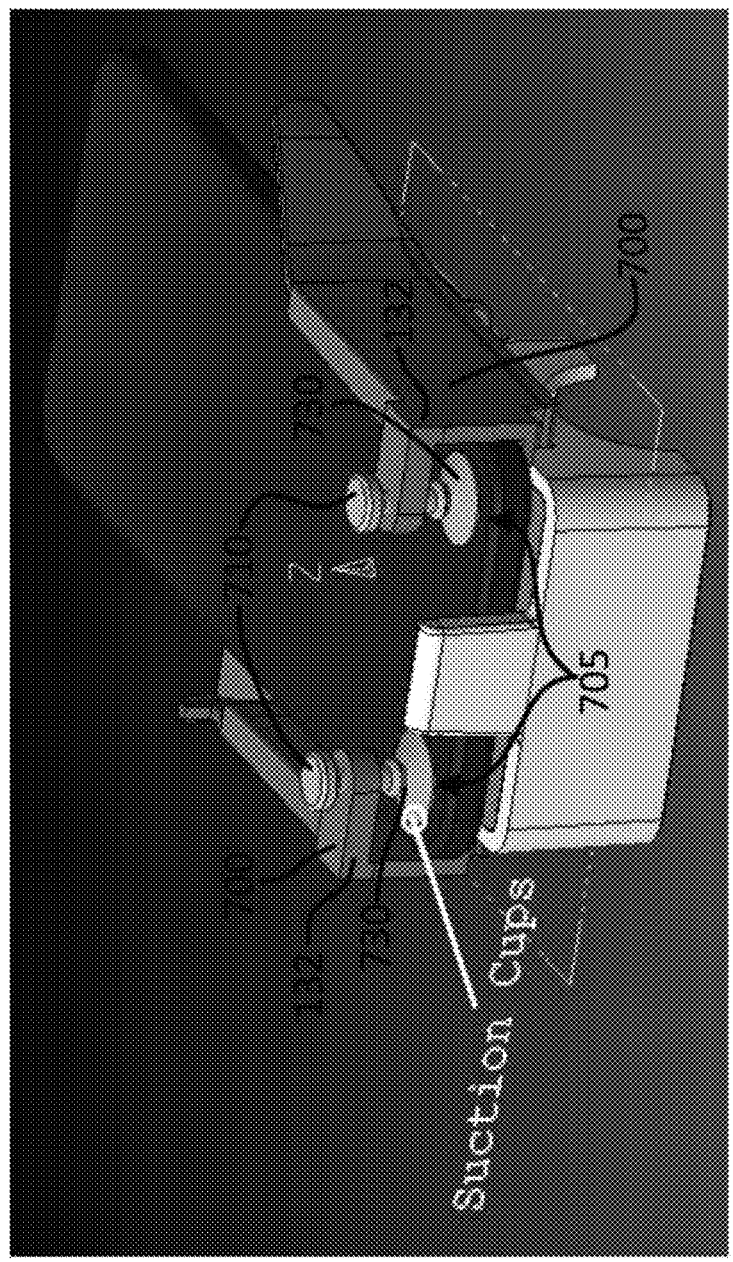
FIG. 21 is a bottom perspective view of an embodiment a smart device holder in accordance with the principles of the present invention, the smart device holder being shown with. resilient members on the side plates comprising suction pads.

Now referring to FIGS. 20 and 21, another embodiment of a device retainer member 700 is illustrated. In such embodiment, the device retainer member 700 comprises retaining elements 705, each retaining member 705 comprising a fastener 710 and pads 720/730. The suction retaining members 705 are generally mounted on the side plates 13 and 14, such as through an aperture in the side plates 13 and 14. Each retaining element 705 is adapted to push a portion of the inserted computerized device against the body 12 or a side plate 13 or 14.

Referring now to FIG. 20, an embodiment using resilient pads 720 is shown. In such embodiment, the fastener 710 is a lock screw attached to a resilient pad 720, such as a rubber pad. A portion 132 of each side plate 13 and 14, such as the bottom portion, extends or protrude over the inserted computerized device. The protruding portion 132 comprises an aperture adapted to receive the lock screw 710. As the lock screw is tightened or loosened, the resilient pad 720 move toward or away from the computerized device. The pression applied by the resilient pad 720 maintains the computerized device in place. Understandably, any other mean to apply a force on the computerized device against the body 12 or the holder 10 may be used as long as such means does not damage the computerized device and securely holds the computerized device in place.

Referring now to FIG. 21, another embodiment of the retaining elements 705 is shown. In such embodiment, the retaining element 705 comprises a lock screw 710 and suction pads 730. Similarly to the previous embodiment, the lock screw 710 is inserted in the threaded aperture 132. As the lock screw 710 is tightened or loosened, the suction pad 730 move toward or away from the computerized device, thus creating a suction effect over the computerized device. The pression applied by the suction pad 730 maintains the computerized device in place.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A width-adjustable computerized device holder device comprising:
   a body;
   a first and a second side members resiliently mounted on each side of the body and adapted to move away from one another;
   an alignment mechanism adapted to control movement of the side members in relation to the body;
   a clamping member mounted to the body, the clamping member being adapted to be mounted to an external member;
   a circuit board configured to communicate with a computerized device; and
   a switch in wireless communication with the circuit board, an activated status of the switch being indicative of the computerized device being inserted in the holder;
   wherein,
      the first and second side members are adapted to move away from one another when the computerized device is inserted between the said first and second members;
      wherein the first and second side members are adapted to press and hold the computerized device upon insertion of the computerized device.

2. The width-adjustable computerized device holder of claim 1, each of the two side members comprising an inclined upper portion, the inclined upper portions of the two side members forming a wider portion adapted to receive a portion of the computerized device to be inserted.

3. The width-adjustable computerized device holder of claim 1, the holder further comprising a stopper adapted to stop the insertion of the computerized device in the holder.

4. The width-adjustable computerized device holder of claim 1, the clamping member comprising a hollow portion adapted to receive a portable power source configured to power the circuit board.

5. The width-adjustable computerized device holder device of claim 1, the circuit board being in sleep mode when the status of the switch is deactivated.

6. The width-adjustable computerized device holder of claim 1, the circuit board further comprising one or more powered port connections.

7. The width-adjustable computerized device holder of claim 1, the holder further comprising a coil having one end contacting one of the side members and the other end contacting the body.

8. The width-adjustable computerized device holder of claim 7, the holder comprising two coils, each coil having one end contacting one of the side members and the other end contacting the body.

9. The width-adjustable computerized device holder of claim 8, the body comprising a hollow portion adapted to receive the coil.

10. The width-adjustable computerized device holder of claim 1, the clamping member comprising a first and a second portions, the first portion being complimentary to the second portion, wherein the first and second portions are adapted to receive at least a portion of the external member.

11. The width-adjustable computerized device holder of claim 1, the holder comprising a device retainer member adapted to secure the computerized device in place.

12. The width-adjustable computerized device holder of claim 11, the device retainer member being a slidable tab adapted to secure the top of the computerized device.

13. The width-adjustable computerized device holder of claim 11, the device retainer member further comprising a mechanism blocking the first and second side members.

14. The width-adjustable computerized device holder of claim 11, the device retainer member comprising a plurality of retaining elements mounted to the side members.

15. The width-adjustable computerized device holder of claim 14, each retaining element comprising a fastener and a pad, wherein tightening the fastener applies pressure between the computerized device and the holder.

16. A method for holding a computerized device to an accessory, the method comprising:
   moving away from one another two resilient side members slidingly mounted to a holder by pushing a portion of the computerized device against an angled portion of the two resilient side members;
   resiliently holding the computerized device between the two side members
   establishing a data communication between the computerized device and a circuit board of the holder;
   detecting geo-localization coordinates of the holder; and
   displaying information on the computerized device based on the detected geo-localization coordinates.

17. The method of claim 16, the method further comprising activating a virtual security lock upon establishing the data communication between the computerized device and the circuit board.

18. The method of claim 17, the method further comprising activating an alarm when the computerized device is pulled of the holder while the virtual security lock is activated.

19. The method of claim 16, the method further comprising:
   establishing a data communication with a digital payment platform;
   sending payment information to the digital payment platform.

20. A width-adjustable computerized device holder device comprising:
   a body;
   a first and a second side members resiliently mounted on each side of the body and adapted to move away from one another;
   an alignment mechanism adapted to control movement of the side members in relation to the body, the alignment mechanism comprising a male portion adapted to slidingly move in a mating female portion;
   a clamping member mounted to the body, the clamping member being adapted to be mounted to an external member; and
   a switch in wireless communication with a circuit board;
   wherein,
      the first and second side members are adapted to move away from one another when a computerized device is inserted between the said first and second members;
      the first and second side members are adapted to press and hold the computerized device upon insertion of the computerized device.

21. The width-adjustable computerized device holder of claim 20, the female portion being a slot and the male portion being one or more protruding members.

22. The width-adjustable computerized device holder of claim 21, the body comprising the slot and each of the side members comprising at least a protruding.

* * * * *